Dec. 11, 1956    N. COHN    2,773,994
CONTROL OF ELECTRICAL GENERATION
Filed March 26, 1953    9 Sheets-Sheet 1

"A" Load   "A" Gen.   "B" Load   "B" Gen.   $F_o$   Interchange

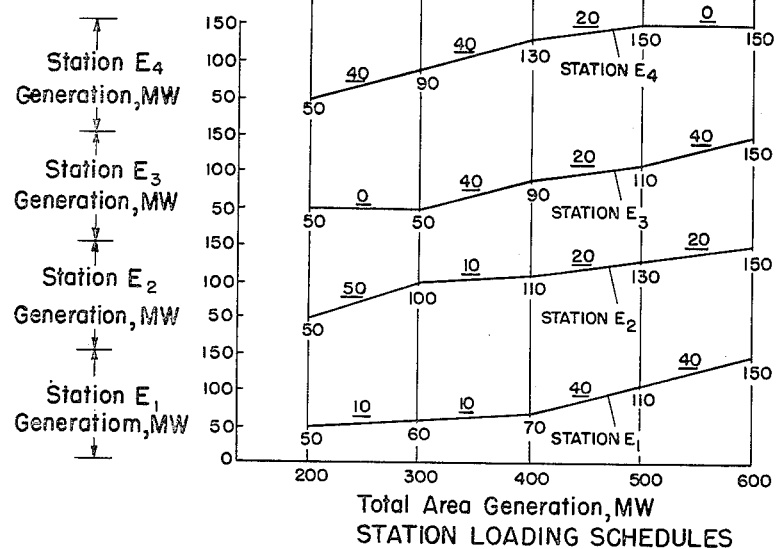
STATION LOADING SCHEDULES
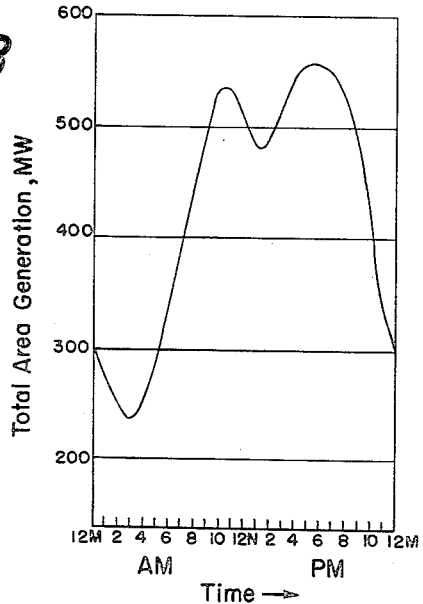
A DAILY LOAD CURVE FOR THE AREA

PROJECTION OF AREA DAILY LOAD CURVE ON STATION LOADING SCHEDULES, AND RESULTING STATION DAILY LOAD CURVES

Dec. 11, 1956  N. COHN  2,773,994
CONTROL OF ELECTRICAL GENERATION
Filed March 26, 1953  9 Sheets-Sheet 8

United States Patent Office 2,773,994
Patented Dec. 11, 1956

2,773,994

CONTROL OF ELECTRICAL GENERATION

Nathan Cohn, Highland Park, Ill., assignor to Leeds and Northrup Company, Philadelphia, Pa., a corporation of Pennsylvania Application March 26, 1953, Serial No. 344,838

34 Claims. (Cl. 307—57)

This invention relates to control of the generation of power in the component areas, stations or units of a distribution network.

It is an object of the present invention to effect sharing of load between generating stations and/or generating units in predetermined relationship despite their unequal rates of response to a demand for changed generation.

In accordance with the present invention as applied to stations of an area, the load dispatcher's office of the area is provided with or has information defining the actual generation of each controlled station of his area; the desired allotments of generation to each of the stations as established by "base point" and "percentage participation" settings; and the actual and scheduled values of the power interchange between his area and the remainder of the network. Upon occurrence of a deviation from the scheduled operating condition of the area, signals demanding corrective change of generation are transmitted from the load dispatcher's office to the stations. At the load dispatcher's office, the deviation from schedule is added to the summation of the differences between the base-point settings and the generations of the stations to provide an area reference. When the difference between the generation and the base-point setting of a station becomes a predetermined percentage of such area reference, further transmission of signals to that station is terminated, whether or not the others have as yet changed their generation to the required extent. It is thus insured that each station shall not be called upon to accept more than its share of the total generation change required of the area for maintenance of its schedule.

The magnitude of the corrective change required of each station, i. e. the "station requirement," or the total generation required of the station to reduce station requirement to zero, may be indicated or recorded.

Similarly and in accordance with the present invention as applied to units of a station, the sum of the generation change required of the station and the summation of the differences between the base-point settings of the individual units and their actual generations is utilized as a station reference. As the difference between the base-point setting and the actual generation of each unit becomes a predetermined percentage of such station reference, that unit is relieved of the demand for further generation change whether or not the other units have as yet changed their generation to the required extent. It is thus insured each unit shall not be called upon to accept more than its predetermined share of the total generation change required of the station to maintain its area on schedule.

The magnitude of the corrective change required of each unit, i. e. the "unit requirement," or the total generation required of the unit to reduce unit requirement to zero, may be indicated or recorded.

More particularly and preferably, the control of the stations of an area or of the units of a station is effected continuously and fully automatically by instruments which are responsive to the quantities above identified, which compute the reference, which may shift the base-point and percentage participation settings, and which provide for termination of signals to each station or unit when its generation bears the proper relation to the area or station reference as above defined.

The invention further resides in systems having the features of novelty and utility hereinafter described and claimed.

For a clearer understanding of the invention and of systems embodying it, reference is made to the accompanying drawings in which:

Figs. 1-3 are explanatory figures discussed in connection with interchange of power between generating areas;

Fig. 4 schematically illustrates the load dispatcher's office and the generating stations of a generating area;

Figs. 4A–4C illustrate allocation of total area generation to individual stations in accordance with segmented incremental loading curves;

Fig. 5 schematically represents control and computer networks utilizable in the system of Fig. 4;

Figure 4:
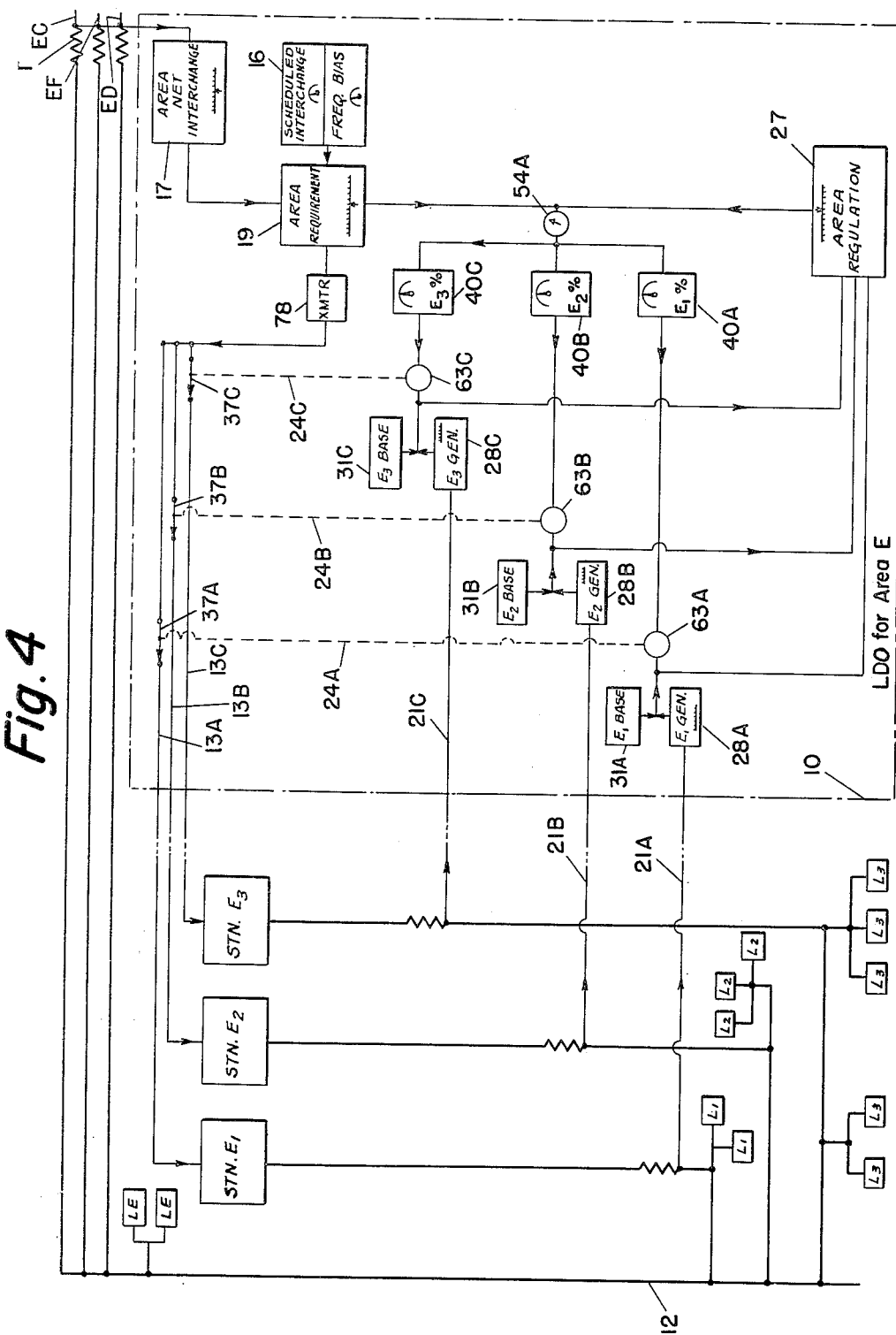
Figure 9:
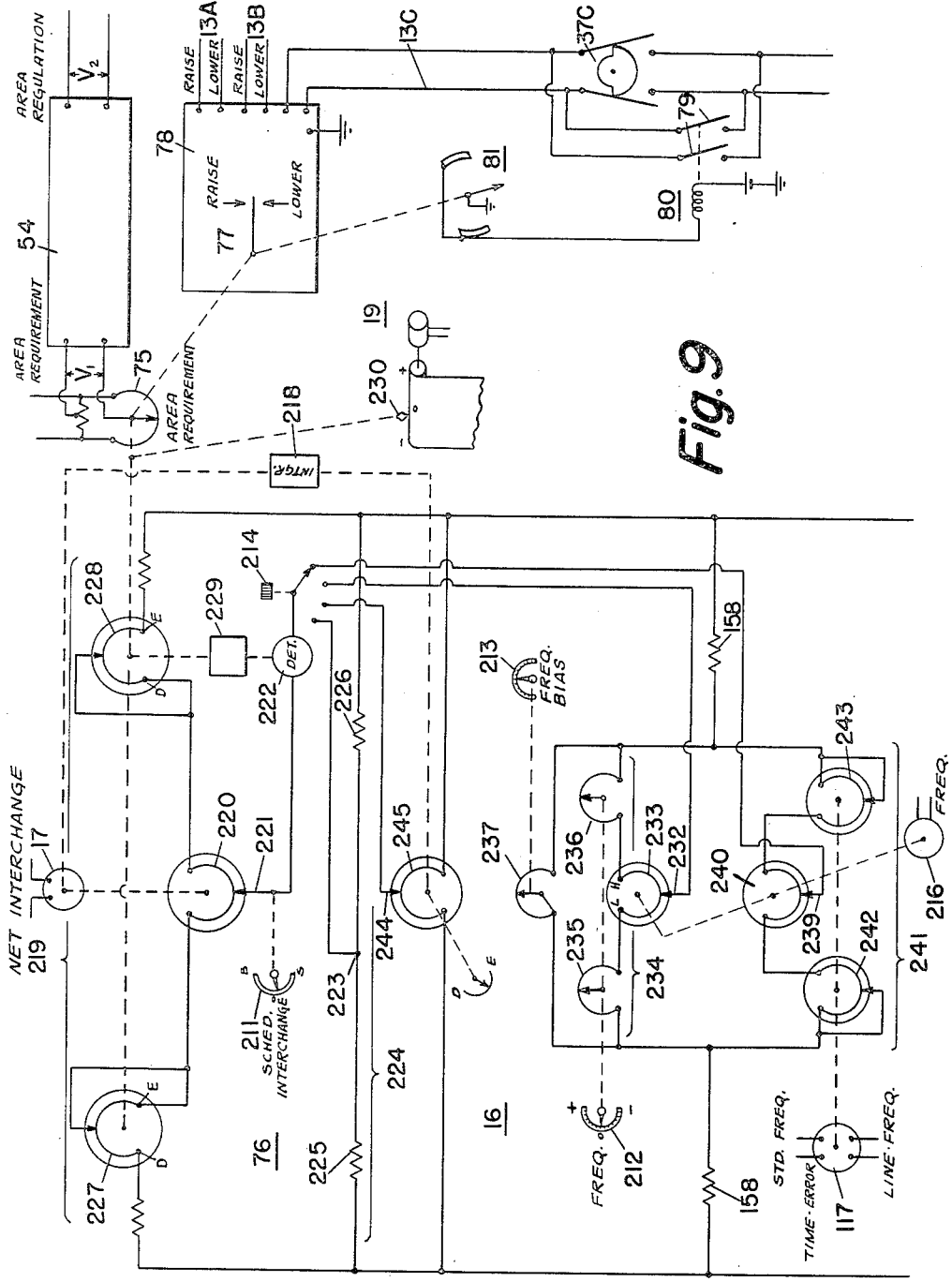
Figure 10:
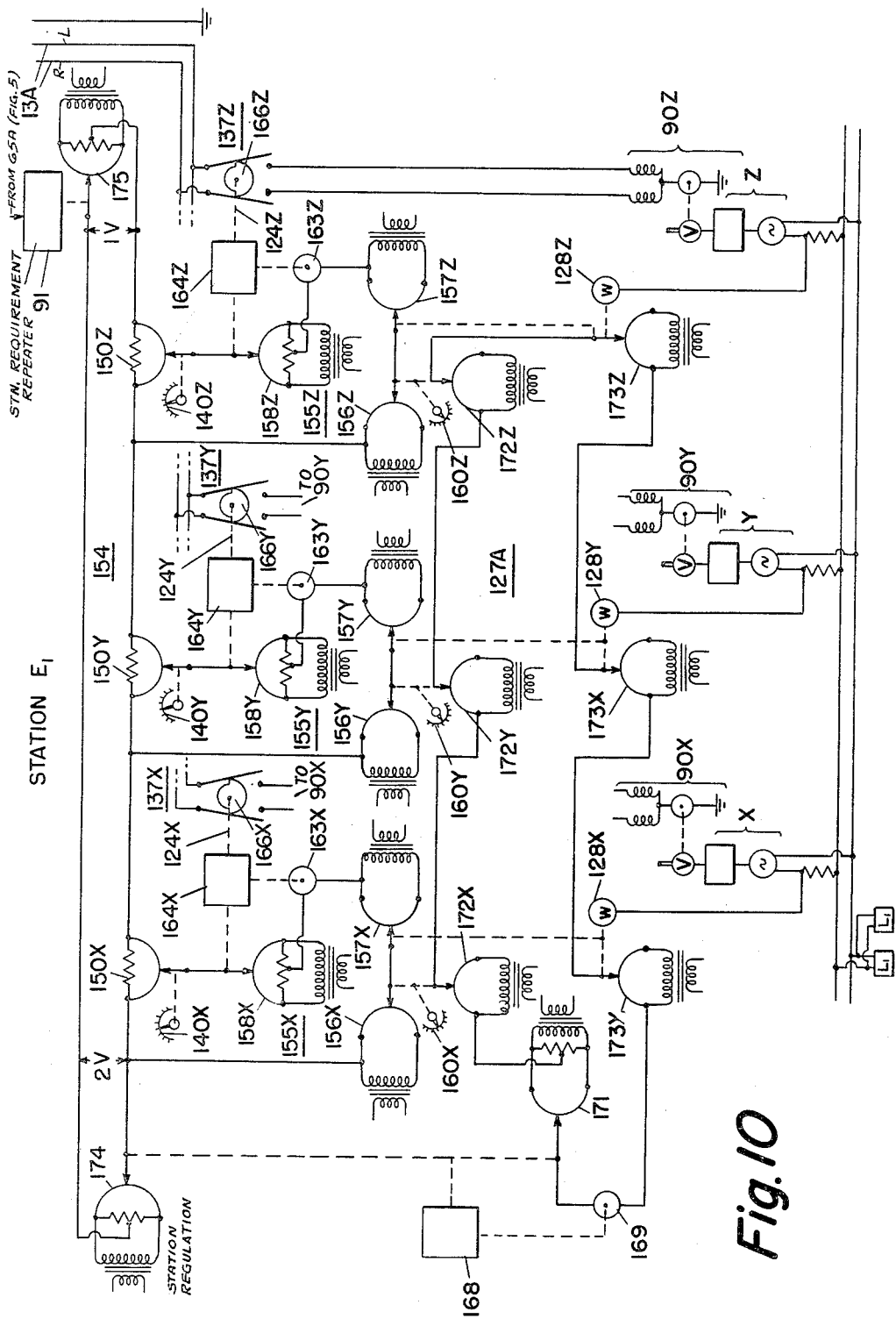

Fig. 9 schematically represents components suitable for inclusion in the system of Fig. 4; and Fig. 10 schematically illustrates computing and control networks suited for use within one or more generating stations of an area.

Figure 1:
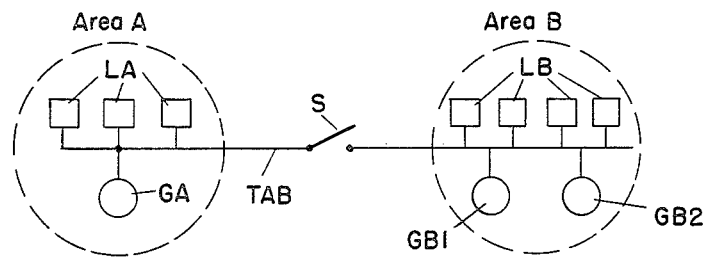
Figures 2A, 2B, 2C, 2D, 2E, 2F:
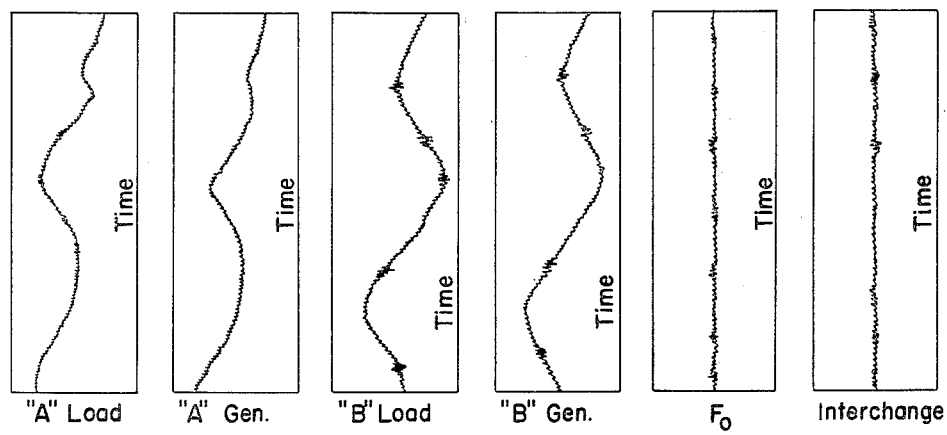
Figure 3:
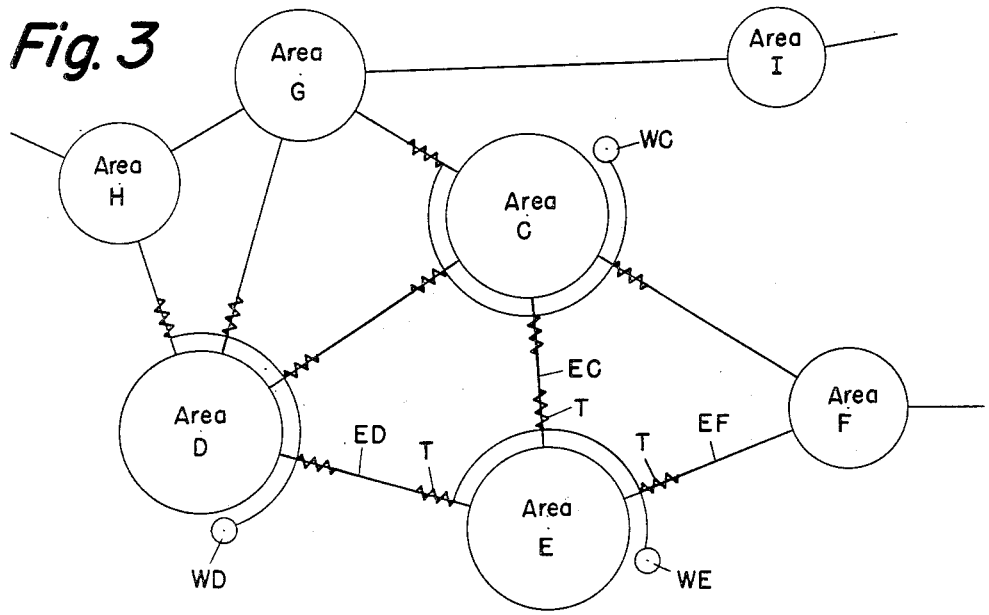

For an understanding of fundamental concepts underlying the invention and of terms used in defining it, there follows a preliminary discussion of explanatory Figs. 1 to 3.

Referring to Fig. 1, the generating area A consists of a single generating unit GA comprising an alternator driven by a prime mover and connected by feeders to the various loads LA of that area. As the load in area A increases, the frequency tends to fall: the governor of the generating unit accordingly tends to increase the input and in doing so increases the generation to carry the additional load. In this isolated area, a changing frequency is an index of whether or not the area generation is equal to area load. Governing action arrests frequency change and matches area generation (Fig. 2B) to area load (Fig. 2A).

The generating area B of Fig. 1 has two generating units GB1 and GB2 connected to the various loads LB of that area. Again in this isolated area, a changing frequency is an index of whether area generation is equal to area load, and, as for area A, the generation (Fig. 2D) of area B is varied by governing action to match the variation of its load (Fig. 2C).

Theoretically, if each of the areas A and B could vary its generation continuously to match its load changes, there would be no interchange of power between them upon closure of switch S to complete a tieline TAB between them. However, in practice, governing action occurs in both areas to match total generation of the interconnected areas to the total load, regardless of where the load changes occur. The result is a flow of power over the tieline to the area deficient in generation. Such interchange of power is a deviation from an assumed scheduled zero value of tieline load.

With the areas A and B interconnected by the tieline, load changes in either area affect the common frequency and consequently a changing frequency cannot be used for determining whether the generation within a particular area matches the load of that same area. With the areas interconnected, the power interchange between them is an index of whether or not each area is keeping its generation equal to its load. It has thus far been assumed that each area has sufficient generating capacity to supply its own load and that normally there is no scheduled interchange of power over the tieline.

It is now assumed that area A, under terms of an agreement between the areas, is to receive a certain amount of power from area B, the amount of that power corresponding with a scheduled interchange between the areas. This schedule may be based on a definite interchange at a specified frequency or upon an interchange varying with frequency. Under such circumstance, the generation requirement of area A is reduced by amount corresponding with the scheduled interchange and the generation requirement of area B is increased by a like amount. If either area fails to meet its new generation requirement, there is a corresponding deviation from the scheduled interchange between the areas.

Usually the situation is far more complex than above discussed and involves a greater number of generating areas, at least some of which usually have several tieline connections to other areas of the distribution network. In such case, it is the relation between the net interchange (the algebraic summation of individual tieline loads) and the total scheduled net interchange of an area at the agreed frequency which determines whether or not the generation in that area is following the load of that area.

In Fig. 3, the generating area E, for example, must compare its scheduled net interchange with the actual power flowing to or from it over the tielines EC, ED, EF which connect it to the areas C, D and F to determine whether the generation in area E is meeting the load requirements of area E including its scheduled interchange. The net interchange of area E may be read, for example, from a totalizing wattmeter WE energized by the algebraic sum of the outputs of thermal converters T—T respectively associated with the tielines EC, ED, EF.

In general, whether the tieline connections be simple or complex, the deviation of the actual interchange between an area and the other area or areas from the scheduled interchange at the agreed frequency is a factor of the "area requirement." It may involve other factors, for example, the frequency deviation from normal. With the last factor suitably included, the deviations of the "area requirement" from a zero value accurately represent the change in area generation required to match the change in area load plus the area's share of frequency regulation.

So far as the obligation of an area to the rest of the network is concerned, it is discharged when the load dispatcher's office, or other operator of that area to whom the responsibility may be assigned, sees to it that his area requirement is zero: i. e., the generation of the area has been varied to maintain its scheduled interchange. When both areas A and B of Fig. 1 operate in this way, the frequency Fo and Interchange curves will be as in Figures 2E and 2F. However, in discharge of this duty, each area should determine how the regulating requirement of the area should be allocated among the generating stations of that area to supply the generation in the most efficient and economical manner in view of the diversity of the generating equipment, of their prime movers, and like factors affecting generation costs and reliability of service. This invention is primarily concerned with systems involving this dual responsibility which may be, and usually is, assigned to the load dispatcher's office.

Referring to Fig. 4, the large broken-line rectangle 10 represents the load dispatcher's office for an area, such as area E of Fig. 3 having tieline connections EC, ED, EF to other generating areas of the same distribution network. For purpose of explanation, it is assumed that the generation of area E is supplied by stations E1, E2, E3 usually miles apart and respectively having local loads L1, L2 and L3. The stations may also supply power to loads LE connected to feeder 12 for the tielines EC, EF, ED.

The schedule in effect for area E at a particular time may require it to supply a certain amount of power to the rest of the network, to receive a certain amount of power from the network, or to have zero interchange with the rest of the network. In all three cases, when the area is on schedule, the area requirement is zero: when the area is supplying more generation than required to maintain the scheduled interchange, the area requirement is "negative"; and conversely, the area requirement is "positive" when the area is generating less than required to maintain the scheduled interchange.

At the load dispatcher's office, the actual interchange of the area, as indicated for example by a totalizing wattmeter 17, is compared with the scheduled interchange as indicated for example by the dial settings of instrument 16. So far as general system aspects of the invention are concerned, it is not material in what manner or by what means such comparison is effected: preferably it is effected automatically and continuously as by apparatus fully described in later discussion of Fig. 9.

So long as the stations E1, E2, E3 change their total generation to match the variations in area load, and, when required, to satisfy their share of frequency regulation, the area is on schedule, i. e., the area requirement, as indicated by recorder 19 for example, is zero, and no demand for generation changes is made from the load dispatcher's office 10 as, in the particular arrangement shown, over the "raise-lower" information or control channels 13A—13C extending from the load dispatcher's office to the respective generating stations. If the area requirement is positive, "raise" signals demanding increased generation are transmitted from the load dispatcher's office over channels 13A—13C to the generating stations E1—E3. Conversely, if the area requirement is negative, "lower" signals demanding decreased generation are transmitted over channels 13A—13C to the generating stations. In either case, assuming switches 37A—37C later discussed remain closed, the generation at one or more of the stations is varied until the area requirement is reduced to zero, whereupon transmission of signals demanding increased or decreased generation is terminated. Thus in effect there is a negative feedback loop from the load dispatcher's office over the signal channels 13A—13C, through the generating stations, feeder 12 and the tielines back to the load dispatcher's office. The condition for equilibrium of this loop (i. e. zero area requirement) is satisfied when the total change in generation of the stations corrects the deviation from scheduled interchange. However, such condition is satisfied regardless of how such total change in area generation is distributed between the three stations E1, E2, E3 and so this simple method of controlling the generation of an area to meet area requirements is not satisfactory because the burden of supplying additional generation may be imposed upon, or be accepted by one or more generating stations at that time already operating at the desired point.

In some previous attempted solutions of this problem, the area requirement existing at any particular time is allocated among the generating stations of the area, but such arrangements have not insured that the desired allocation would actually be obtained. In such system, the generation change of each station is introduced into the first feedback loop as it occurs and practically always changes the area requirement to a new value before all stations have assumed their allocated share of the original requirement. To clarify this point, let there be assumed a positive 10 megawatt area requirement to be allocated so that stations E1—E3 should respectively accept 40%, 58% and 2% of such requirement. At the end of a certain period station E1 has increased its generation by 4 megawatts (its full share), whereas the others have lagged behind, station E2 increasing its generation by only 0.9 megawatt and station E3 by only 0.1 megawatt. Thus, although station E1 has met its original requirement, there would still remain an area requirement of 5 megawatts, which, if allocated on the same percentage basis as before, would require station E1 to pick up an additional load of 2 megawatts. Thus, an undue share would be imposed upon the generating station which more rapidly accepts its allocation of an area requirement.

In accordance with the present invention, each station has a second feedback loop including the area-requirement meter 19, a signal channel (13A, 13B or 13C), a telemetering channel (21A, 21B or 21C) for a station generation device (28A, 28B or 28C), the base-point and percentage participation devices (31A, 40A: 31B, 40B: 31C, 40C) and a link (24A, 24B or 24C) for operating the corresponding switch 37A, 37B or 37C.

The total of the differences between the actual generation and the base-point settings of the individual stations is added to the area requirement to provide a reference and the percentage allocation is based on such reference which is the sum of these two oppositely varying quantities. Information totalized to correspond with "area regulation" (total of the differences between actual generation and base-point settings of the individual stations) may be derived from the information channels 21A–21C, and from the base-point settings assigned to the station. Thus, in effect there is associated with each station a third feedback loop which compensates for the generation increments received via the tielines from the controlled stations in the first feedback loop, so that the condition for equilibrium of the second feedback loop of each station is satisfied only when that station has assumed its allocated share of the regulating requirement.

In practice, an operator at the load dispatcher's office may actuate switches 37A—37C, or their equivalent, in accordance with the readings of instruments indicating or recording the various quantities above identified. Preferably, however, the supervision is performed continuously and automatically by a system which collects and utilizes such information as that concerning area requirement, area regulation, individual station generation and individual station base-point and participation settings, and which controls the generation such as by the transmission of "raise" and "lower" signals in manner above described to insure that each station shares the regulating requirements of the area in accordance with its assigned allocation. Operation of the system may involve change of the participation setting, the base-point settings, or both, either continuously or step-by-step as a function of the total generation, or as a function of the algebraic sum of a factor based on total generation and a factor based on area requirement.

Figure 5:
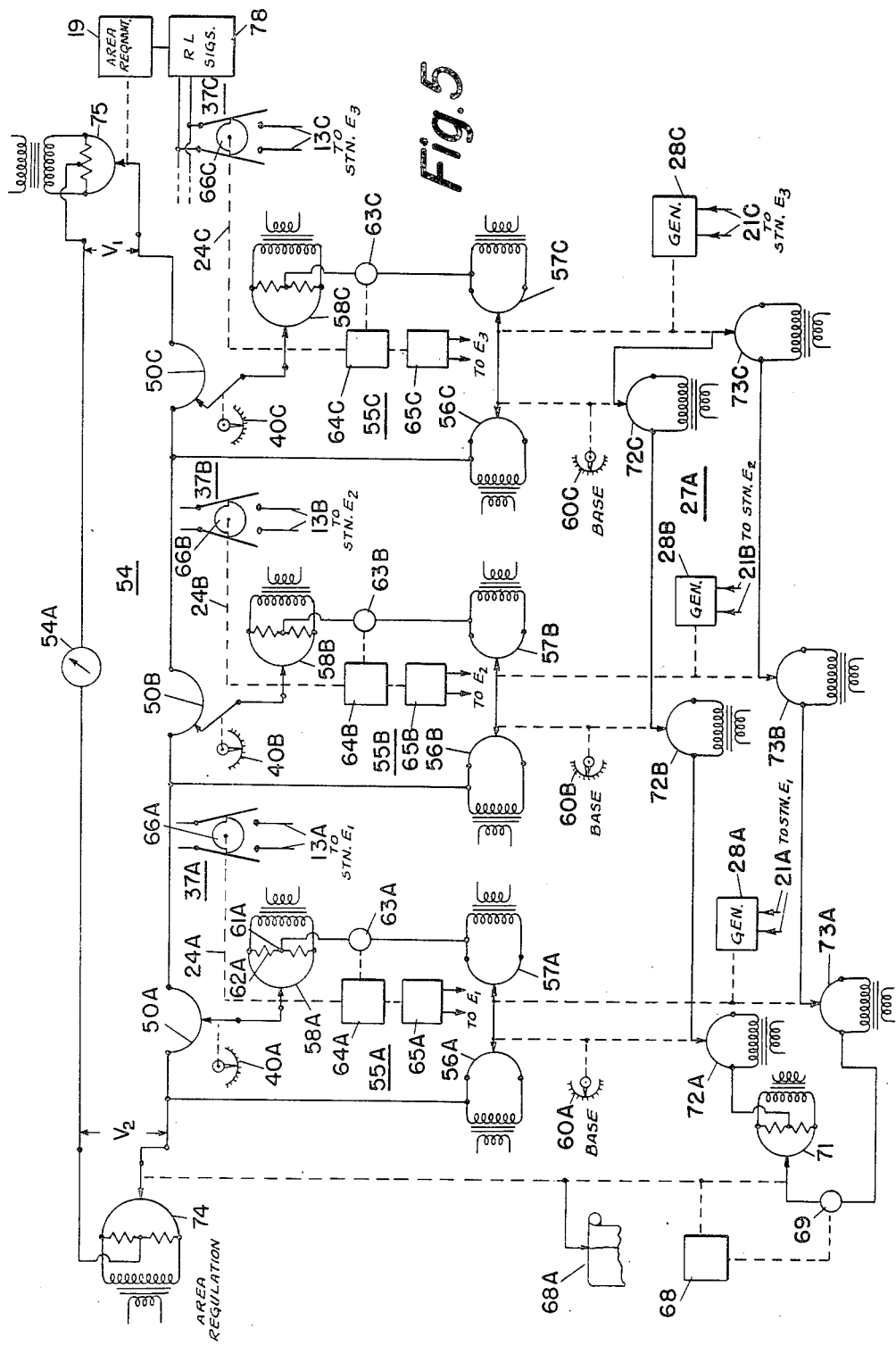

One arrangement suited for use at the load dispatcher's office automatically to perform certain significant steps of the supervisory control above described is shown in Fig. 5. The desired schedule for loading the station of the area may be set by adjustment of the station base-point slidewires 56A—56C having dials 60A—60C and the station participation slidewires 50A—50C having dials 40—40C. The three slidewires 50A—50C are in series in a network 54 including a source of voltage V₁ varying in correspondence with area requirement and a voltage V₂ varying, as later described, in correspondence with area regulation. The voltage V₁ may be the output voltage of a tapped slidewire 75 adjusted by the area requirement meter or recorder 19. Such voltage is zero for zero area requirement, of finite value for a finite area requirement, and is of one phase of instantaneous polarity or the other depending upon whether an area requirement is positive or negative.

The participation slidewires 50A—50C are also respectively included in networks 55A, 55B, 55C in number corresponding with the controlled stations of the area. As these networks are of similar composition, only one of them need specifically be described. Network 55A for control of station E1 (Fig. 4) includes in addition to the station participation or percentage slidewire 50A the three potentiometer slidewires 56A, 57A, 58A, each supplied from its own source of constant current or from a common source. Such sources, as well as all of the others used, may be of direct current or of alternating current, as shown. The slidewire 56A is set by the load dispatcher in correspondence with the base point of station E1, the associated dial 60A continuously indicating the selected base point. The slidewire 57A is adjusted, as by recorder 28A, in accordance with the actual generation of station E1. Assuming that the network 55A is in balance, the output of slidewire 58A is zero when the difference between the output voltages of the slidewires 56A and 57A is equal and opposite to the output voltage of participation slidewire 50A. If such equality does not exist, a detector 63A responsive to the unbalance of network 55A, through a suitable relay mechanism 64A, such for example as disclosed in U. S. Letters Patent 1,935,732 or 2,367,746, effects relative adjustment between the slidewire 58A and its contact in proper sense and to the extent required to balance network 55A. The extent of this adjustment which may be indicated or recorded is a measure of the existing regulating requirement of the station and is termed "station requirement." This measurement may be used by the load dispatcher in manual control of the "raise-lower" signals. Such balancing or relay mechanism may also automatically initiate or route "raise" or "lower" signals as for example by effecting closure of the corresponding side of switch 37A. As schematically illustrated in Fig. 5, the actuator 66A of switch 37A is connected to the rebalancing mechanism 64A by a mechanical linkage generically represented by dotted line 24A. The actuator 66A is shaped so that the "raise" contacts are closed for one sense of displacement of slidewire 58A from zero output position and the "lower" contacts closed for the opposite sense.

The sense and extent of such rebalancing adjustment, corresponding with the allocated station requirement of station E1, may be transmitted to station E1, as by a telemetering transmitter 65A controlled by the relay mechanism 64A, where it may be used by the station operator in manual control of the station generation or by automatic control mechanism later described. Specifically, as in copending Phillips application, Serial No. 211,663, now U. S. Letters Patent 2,754,429, the telemetering transmitter 65A may be an oscillator whose frequency is varied by a slidewire adjustable concurrently with slidewire 58A.

In the particular arrangement of Fig. 5, upon occurrence of an area requirement and assuming that slidewire 58A is away from its zero output position, the switch 37A of channel 13A to station E1 provides a path for transmission of "raise" or "lower" signals to station E1, until network 55A is again rebalanced with slidewire 58A in its zero output position, whereupon the switch is opened automatically to prevent further transmission of signals. Such rebalance is the result of the changed setting of slidewire 57A due to the changed generation of station E1 as measured by recorder or meter 28A. In like manner the switches 37B, 37C in the transmission channels 13B, 13C to stations E2, E3 are similarly controlled by the balanceable networks 55B, 55C.

Thus, assuming the networks 55A—55C are in balance with slidewires 58A—58C in zero position and that voltages V₁ and V₂ are zero (i. e. generation of each station equal to its base-point setting and area requirement zero), then upon occurrence of an area requirement, "raise" or "lower" signals are sent over channels 13A—13C from the load dispatcher's office to each of the controlled stations E1—E3 having a participation setting other than zero. When in response to the demanded change in generation one of these stations has met its allocated share, the further transmission of signals to that station is interrupted by opening of the corresponding switch 37A, 37B or 37C.

However, the stations practically never pick up their loads at similar rates, and it is a prime purpose of this invention to insure that each station takes its share of allocated regulation—no more, no less—without regard to the rate at which other stations take their allocated share. Control action to each station is terminated when it assumes its allocated share without effect on or by the other station.

To accomplish these objectives, there are introduced into the network 54 the two voltages $V_1$ and $V_2$; the former ($V_1$) is varied in accordance with area requirement and the latter ($V_2$) is varied in accordance with the algebraic sum of the differences between the base-point settings and the actual generation of the controlled stations.

It has already been pointed out that generation allocations to stations from area requirement only (i. e. $V_2$ omitted) will result in imposition of an undue share of total generation on the more rapidly responding stations. There will now be discussed the result of allocation on a basis of only the total generation, or a factor related thereto such as area regulation: in Fig. 5, this is equivalent to omission of voltage $V_1$ from network 54.

In such case, the networks 55A—55C including slidewires 58A—58C will be in balance when each station has taken its allocated share of the total existing area generation. Under such circumstances, all the switches 37A—37C will be "open," so that upon subsequent occurrence of a positive area requirement, for example, the "raise" signals originated at 78, are not routed to any station. Thus the area fails to take action to satisfy the area requirement. Now assuming that switch 37A is arbitrarily closed to permit the "raise" signals to go to station E1, the resultant increase in generation of station E1 is reflected as an increase of voltage $V_2$, a percentage of which appears across slidewire 50A of network 55A. The increase in generation of station E1 appears in full across slidewire 57A of network 55A. As a result, the rebalancing slidewire 58A of network 55A may now show a requirement for decreased generation by station E1 and the "raise" contact of switch 37A is opened even though station E1 has not yet taken its allocated share of the area requirement. The networks 55B, 55C recognize that voltage $V_2$ has increased and their rebalancing slidewires 58B, 58C effect closure of the "raise" contacts of switches 37B, 37C. Thus, with voltage $V_1$ omitted, the response of one station (E1) influences the requirement readings of the other stations (E1, E3) and for none of the stations is the requirement reading directly related to the existent regulating needs of the area.

The direct relation to existent regulating needs and independence from the rate at which the stations individually carry out their regulating assignments are achieved when both of the voltages $V_1$ and $V_2$ are included in network 54.

For given base-point settings, the algebraic sum of voltages $V_1$ and $V_2$, or the current produced by such sum, constitutes a reference definitive of the change required in area generation from the sum of the base points to meet the area's schedule. Thus, this reference corresponds at the agreed frequency with the change in load of the area from the sum of the base points. In contrast thereto, were voltages $V_1$ omitted from network 54, the reference would correspond to the change in generation of the area from the sum of the base points.

This reference, at the agreed frequency, remains fixed after a load change in the area despite the generation changes effected in the area to accommodate such change: thus, during its control and having once met its assigned allocation, the station is unaffected by change in generation of the other stations. At other frequencies, this reference is modified in sense and to extent which corresponds with the generation increment required for satisfaction by the area of its share of frequency regulation.

This reference may be measured as by meter or recorder 54A. The output voltage of each of slidwires 50A—50C may be measured or recorded and corresponds with the percentage of the area's load and frequency regulating needs beyond the sum of the station base points allocated to the corresponding station. Such measurements may be utilized by the load dispatcher in manual control of the "raise-lower" signals as discussed in connection with Fig. 4.

Specifically, the voltage $V_2$ may be produced by a slidewire 74 which is adjusted in unison with the balancing slidewire 71 of a computing network 27A. This network comprises a plurality of pairs of slidewires, the output voltage of one slidewire of each pair corresponding with the base-point setting of the corresponding generating station and the output voltage of the other slidewire of the pair corresponding with the generation of that station. For example, the output voltages of slidewires 72A, 73A respectively correspond with the base-point setting and the actual generation of station E1. The slidewire 72A of network 27A is mechanically coupled to the slidewire 56A of participation network 55A so that the load dispatcher in setting the dial 60A to the desired base-point setting for station E1 concurrently adjusts the slidewires 56A, 72A of the two networks 55A, 27A. The other slidewire of the pair for station E1, namely, slidewire 73A of network 27A, is mechanically coupled to the slidewire 57A of network 55A for concurrent adjustment, as by the generation recorder 28A for station E1. In like manner, the remaining slidewires of network 27A are grouped in pairs, the slidewires 72B et seq. being respectively mechanically coupled to the slidewires 56B et seq. and the slidewires 73B et seq. being coupled for adjustment in unison with the slidewires 57B et seq.

Assuming that the sum of the output voltages of the slidewires 73A, 73B et seq. is equal to the sum of the output voltages of the slidewires 72A, 72B et seq., the network 27A is in balance for zero output voltage of the balancing slidewire 71 which, as shown, is a tapped slidewire affording zero output with the slidewire in an intermediate or center position with respect to the associated contact.

If the sum of the output voltages of the base-point settings of slidewires 72A, 72B, 72C is larger or smaller than the sum of the output voltages of the generation slidewires 73A, 73B, 73C, the network 27A is unbalanced in sense and to extent corresponding with the difference of such sums and the detector 69 in response to such unbalance effects, through a suitable relay device 68, a rebalancing adjustment of the slidewire 71. This difference between the total of the base-point settings of the stations and the total generation of the stations (such difference corresponding with area regulation) is injected into network 54 as voltage $V_2$ which is algebraically additive to the area requirement voltage $V_1$. Specifically in the particular arrangement shown in Fig. 5, the voltage $V_2$ is the output voltage of a tapped slidewire 74 adjustable in unison with rebalancing slidewire 71 of network 27A by the detector-relay mechanism 68, 69 which may be of type disclosed in aforesaid Patents Nos. 1,935,732 and 2,367,746.

For simplicity of description of operation of the complete system, it is again assumed that the generation of each station is equal to its base-point setting and that no area requirement exists. In such case the network 27A is in balance with the slidewire 71 in its zero output position and the voltages $V_1$ and $V_2$ of network 54 are also both of zero value. It is further assumed that for the particular base-point settings of the stations, any positive area requirement should be divided between them in the ratios of 40%, 58% and 2% as determined by the settings of dials 40A—40C. It is now again assumed that there occurs a positive area requirement of 10 megawatts, whereupon voltage $V_1$ assumes a value of polarity and magnitude corresponding with such area requirement and effects flow of current of corresponding magnitude and direction through the slidewires 50A, 50B and 50C. Accordingly, in each of the networks 55A—55C, there is introduced a voltage proportional to that percentage of such current which is determined by the settings of the dials 40A, 40B, 40C. The detectors (63A—63C) respond to unbalance of the associated network (55A—55C) and, through the relay devices (64A—64C), effect closure of switches 37A—37C in the "raise-lower" channels 13A—13C to the stations of the area in sense demanding increased generation.

As each station increases its generation in response to the "raise" signals sent over the channels 13A—13C, the generation change of each station is introduced into the corresponding one of networks 55A—55C by adjustment of the slidewires 57A—57C, and the total of such generation change is introduced into the network 27A by the adjustment of slidewires 73A—73C. Thus, as voltage $V_1$ is reduced by the effect of the increased generation of those stations upon the area requirement, the voltage $V_2$ is correspondingly increased so that the sum of these voltages remains constant, aside from the aforementioned effect of frequency upon this reference. Thus, the current through the slidewires 50A—50C remains essentially constant. As each station meets its allocated percentage of the assumed area requirement, its network (55A, 55B or 55C) comes to balance and opens the associated switch (37A, 37B or 37C) to terminate the demand upon the station for any further increase of generation regardless of whether or not the other stations have met their share of such area requirement. For the example given, the additional generation taken by stations E1, E2, E3 is therefore 4, 5.8 and 0.2 megawatts, respectively.

The provision of network 27A and the introduction into network 54 of voltage $V_1$ representative of area requirement and of voltage $V_2$ representative of the difference between the summation of the base-point settings of the stations and their total generation insures that each of the stations takes its allocated percentage of the area requirement, no more or no less.

With the control system shown in Fig. 5, and in absence of an existing area requirement, the adjustment by the load dispatcher of the base-point slidewires 56A—56C or of the participation slidewires 50A—50C cannot result in any change in generation although the station-requirement slidewires 58A—58C assume new readings.

If the sum of the settings of the participation slidewires is 100%, the algebraic sum of the station requirements is equal to the area requirement. In the example above fully discussed, the assumed conditions included station requirements of zero. If due to the aforesaid manual resettings of base and participation dials or due to manual generation adjustments this were not so, there would always be at least one station requirement in the same sense as any subsequent area requirement so that at all times at least one station channel (13A, 13B, or 13C) is in condition to accept controlling signals. Continuance of the controlling signals as additional load changes occur in the area will ultimately return all station requirements to zero and place all stations on their assigned schedules.

In the previous discussion which concerns the preferred mode of operation, the recorder 68A records the positive and negative deviations of actual generation from the sum of the base-point settings. With slidewires 56A—56C, 72A—72C set at zero or omitted, the recorder 68A records the total generation. In both cases, existence of an area requirement demands a change in station generation proportioned by the setting of the corresponding slidewires 50A, 50B or 50C. Restoring slidewires 56A—56C, and transferring slidewires 72A—72C to network 54 results in control having the same characteristics described for Fig. 5 even though the position of slidewire 74 now represents area generation instead of area regulation.

By omitting generation slidewires 57A—57C from networks 55A—55C, the balance positions of slidewires 58A—58C correspond with the total generation required of the corresponding stations for all settings, including zero, of the base-point setting slidewires 56A—56C, 72A—72C. In such case, the load dispatcher may operate switches 37A, 37B or 37C in accordance with the difference between the actual generation of the corresponding station as indicated on recorder 28A, 28B or 28C and the balance positions of slidewires 58A—58C, or such difference may be utilized in automatic control.

In the network 54 of Fig. 5, the slidewires 50A—50C are in series and traversed by current which is proportional to the algebraic sum of the voltages $V_1$ and $V_2$. This network may be replaced by the network A54 of Fig. 6 in which the slidewires 50A—50C are connected in parallel, so that the voltage as read by meter 54V, across each of them corresponds with the algebraic sum of the voltages $V_1$, $V_2$. The manner in which these slidewires are connected in their respective networks 55A—55C and the manner in which this network operates is the same as discussed in connection with Fig. 5 and need not be repeated.

Figure 7:
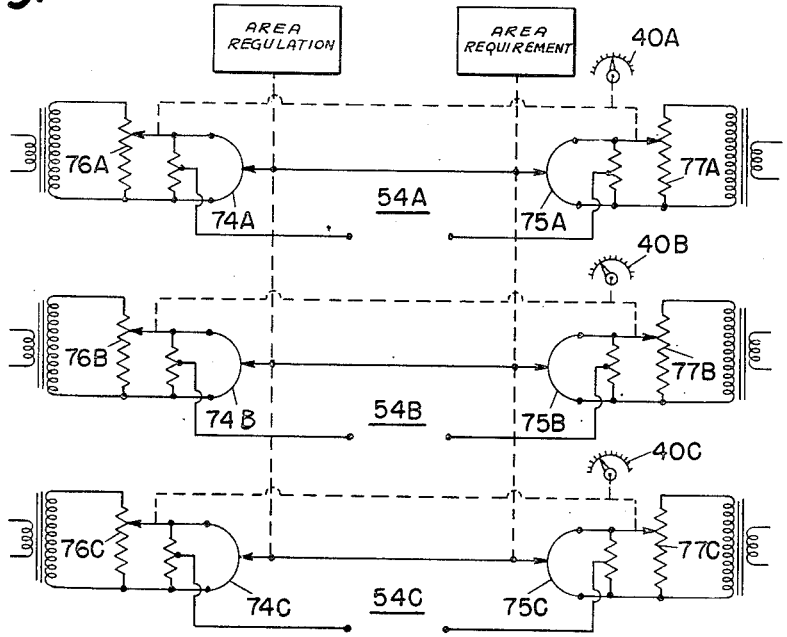

In the modification of Fig. 5 shown in Fig. 7, the single area-requirement slidewire 75 of Fig. 5 is replaced by the slidewires 75A, 75B et seq. adjusted in unison, and the area-regulation slidewire 74 of Fig. 5 is replaced by the slidewires 74A, 74B et seq. adjusted in unison. The sum of the output voltages of each pair of area-regulation and area-requirement slidewires is balanced, as in Fig. 5, against the difference of voltages respectively corresponding with the base-point setting and the generation of a particular station. The current of each pair of slidewires 74A, 75A, 74B, 75B etc. is preset in accordance with the desired allocation of area requirement among the several stations. Specifically, as shown in Fig. 7, the current supply source for each of the slidewires includes a potentiometer, a Variac or the like, (as 76A—76C and 77A—77C) and the adjustable element of the sources for each pair of the slidewires is coupled for concurrent adjustment by one of the percentage setting dials 40A—40C. More specifically, the dial 40A is coupled to the adjustable contacts of the potentiometers 76A, 77A so that the effective output voltage of slidewire 75A is proportional to that percentage of the area requirement corresponding with the setting of dial 40A and the effective output voltage of slidewire 74A is proportional to that same percentage of the difference between the sum of the base-point settings and the sum of the generation of each of stations E1, E2 and E3. The algebraic sum of these two voltages is applied to the network 55A of Fig. 5 in substitution for the voltage produced in that figure by the slidewire 50A. In like manner, the sum of the effective output voltages of the slidewires 74B, 75B of Fig. 7 is introduced into network 55B of Fig. 5 in replacement of the output voltage of slidewire 50B etc. Thus in Fig. 7, the networks 54A, 54B and 54C jointly replace the network 54 of Fig. 5. In other respects, the composition and operation of the system is the same as that of Fig. 5 and further discussion is therefore unnecessary. The arrangement of Fig. 5 is preferred because requiring fewer components to achieve the same new result.

The slidewires of each pair (76A, 77A: 76B, 77B etc.) may be individually adjustable and are so used in the control systems of my copending application Serial No. 609,111.

Figure 4C:
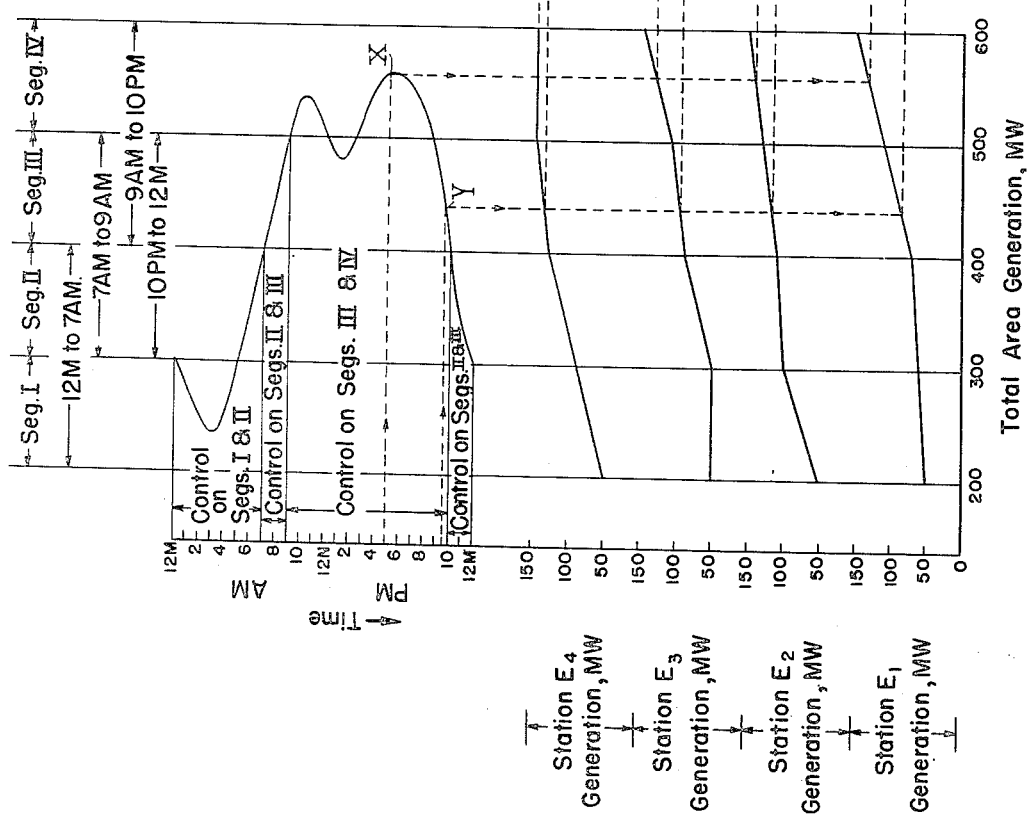

As has already been stated, another prime objective of this invention is to automatically assign generation to stations in accordance with preset loading schedules, thus achieving efficient area operation while fulfilling the area's overall regulating requirements. Figs. 4A–4C will show more explicitly what is typically sought in this connection, and will show schematically how the control accomplishes the desired end result.

It is assumed that the area in question has four stations E1–E4, which are to participate in the control, and that the curves (Fig. 4A) represent the loading patterns applicable to the four stations for the period under consideration.

Quantitative magnitudes have been assigned to these curves to facilitate the examination of how each station is to be loaded as the total area generation varies from one level to another. Also, this quantitative data will be useful later in this discussion to explain the adjustments that are available to establish the desired loading patterns.

It will be seen from Fig. 4A that when the total area generation is 200 megawatts, each of the four stations is to carry 50 megawatts. As total area generation rises from 200 to 300 megawatts, the 100 megawatt increment is to be divided unequally among the four stations, station E1 taking 10 megawatts, station E2 taking 50 megawatts, station E3 taking none of the increment and remaining base-loaded at 50 megawatts, and station E4 taking 40 megawatts. Other incremental loading patterns apply for other portions of these curves.

Such loading curves are generally prepared prior to the operating period to which they are to apply. They take into consideration which generating facilities are available, and what their relative capacities and incremental economies are. They may include the weight of other factors such as loadings and losses on transmission lines within the areas, location of reserves, the ability of specific plants to respond to control action, and stream flow or storage conditions where hydro is involved. In any event, load dispatchers, in order to assign loading to stations, either manually or automatically, would have such curves, or equivalent.

These loading patterns may be simple or complex, and they may be fixed or may vary during the course of a day.

For the present discussion, it is assumed that loading schedules as in Fig. 4A are to apply. For each station, it is assumed that the loading curves consist of a series of connected straight lines. For purposes of control application, the whole series of curves are divided into "segments." A segment is that straight line portion of each loading curve defined by a spread of area generation within which none of the station curves changes its slope.

Thus, in Fig. 4A segment I extends from total area generation of 200 to 300 megawatts. Similarly, segments II, III and IV run respectively from 300 to 400, 400 to 500, and 500 to 600 megawatts. In this particular example, the segments all happen to be of equal extent. They could be of unequal lengths in a set of actual area loading curves.

It will be noted that the loading curves for stations E1 and E4 do not change their slopes over the area generation range of 200 to 400 megawatts. The slopes for the curves of stations E2 and E3 do change in this section however; hence the splitting of this portion of the curves into two segments.

Each segment of a station-loading curve is established by a point and a slope. The points are the intersections of consecutive segments of a station-loading curve, or the boundaries of each segment, and are defined as "base points." The slopes are indicative of what portion of each increment in total area generation will be taken by each of the stations. The slopes can be defined in terms of this fractional increment, or as a percent participation in the total area generation change. In the present discussion, slopes are defined as "participation" in megawatts per one hundred megawatts. Numerical assignments for participation are hence the same as if a percentage basis were used.

The magnitude of the base points and participation slopes are shown for each of the station curves in Fig. 4A. The figures for the slopes are underscored.

For the curve of station E1, the base points are consecutively 50, 60, 70, 110 and 150 megawatts; while the participations of its four segments are respectively 10, 10, 40 and 40 megawatts per one hundred megawatts.

The sum of each set of base points for the four stations is equal to the coordinate of total area generation on which they fall. Also, for a given set of segments, the sum of the participations for the four stations is equal to 100.

Turning now to Fig. 4B, this is a typical daily load curve for the area. Area-load curves will, of course, vary from day to day, but at any given time on any given day the object of the area control is to automatically divide the total area generation among the four stations in accordance with the allocation patterns of the curves shown in Fig. 4A.

The basic method by which the control undertakes to achieve this objective is shown graphically in the curves of Fig. 4C. Here the daily load curve from Fig. 4B is projected on the station loading schedules of Fig. 4A from which projection there results the daily-load curves for each station, as shown in the right-hand sketches of Fig. 4C.

Detailed projections are shown in Fig. 4C for two typical points on the area daily load curve.

At 5 P. M., for example, the total prevailing area generation is as shown at X on the area daily load curve. This point is projected as shown to the loading schedules for the four stations, and points of intersection are further projected until they intersect with the 5 P. M. coordinate in the right-hand sketch of Fig. 4C. This establishes the four X points which identify, on their respective scales, how much of the total area generation will be assigned at that time by the control equipment to each of the four regulating stations.

Similar projections are shown for point Y on the area daily load curve, which occurs at 9:30 P. M., and corresponding Y points are thus established on station daily load curves.

The control is applied continuously to carry out such projections. Its net effect is to take the area daily load curve as it actually develops, regardless of its shape, and allocate the prevailing need for total area generation to the four stations in accordance with the prevailing station loading schedules. To achieve this, with the arrangements shown in Figs. 5 to 7 where there is shown only one base-point setting and one participation setting per station, it would therefore be necessary for the load dispatcher's office to change the base-point and participation settings of the generating stations from time to time in accordance with the total generation required. The change of base-point and participation settings may be effected automatically in accordance with total generation, or in accordance with the summation of a factor related to total generation and another factor related to area requirement.

Figure 8:
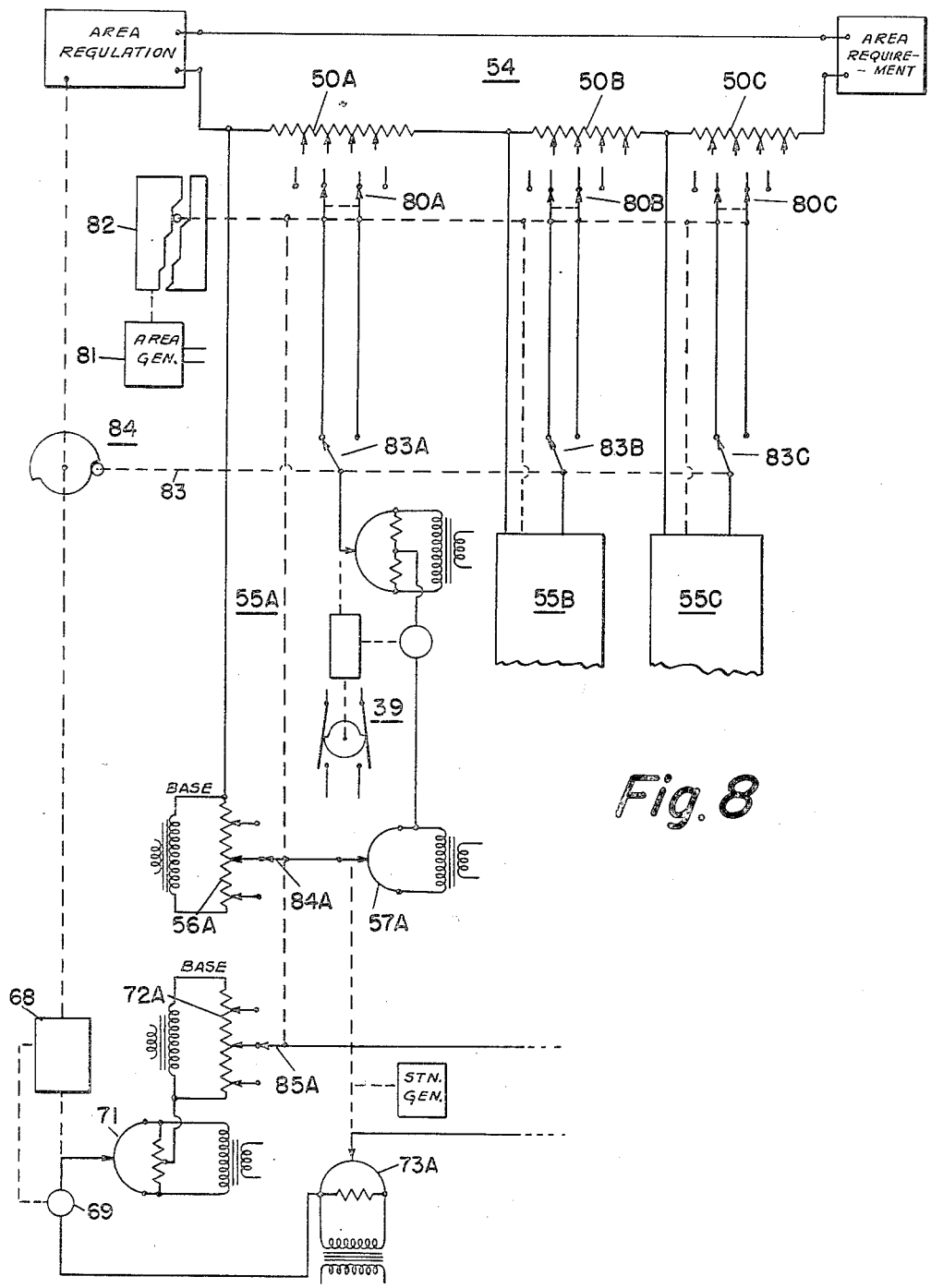
Fig. 8 is a modification of the network of Figs. 5 and 10 which affords automatic incremental loading.

The modification shown in Fig. 8 provides for automatically shifting the base-point and percentage allocation settings of the stations in accordance with the total generation and the direction in which it is changing and provides for automatically selecting between two participation settings in accordance with the area regulation. Specifically and as shown, each of the percentage slidewires 50A, 50B, 50C is provided with a multiplicity of taps, each respectively corresponding with the desired percentage allocation of a particular station when the total generation is within certain limits: equivalently, there may be provided in lieu of each of the slidewires 50A—50C a group of parallel-connected slidewires respectively preset in accordance with such percentages. In either case, the slidewire points corresponding with such preset percentages are connected to the terminals of the corresponding one of the multi-point switches 80A—80C. Each switch has a pair of contacts movable in unison and each pair of contacts is positioned in accordance with total area generation.

As schematically indicated in Fig. 8, all of the movable contacts of switches 80A—80C may be ganged for operation in unison, as for example by a cam 82 contoured to actuate the switches at preselected values of total generation, the cam being actuated, for example, by a total area generation recorder 81. Thus, for each transition point of cam 82, or equivalent, there are available two output voltages from each of the slidewires 50A—50C, or equivalent. The switches 80A—80C may be actuated by relays selectively energized at readily adjustable values of total generation. Which of these two output voltages is introduced into the corresponding network 55A—55C depends upon whether the area regulation is positive or negative and their selection is effected by switches 83A, 83B, 83C. Each of switches (83A—83C) may be a single-pole, double-throw switch mechanically operated by a cam and follower arrangement 84 or they may be relays controlled by contact structure movable with slidewire 71. When only two-segment control is involved, cam 82 or its equivalent may be omitted and the segment selection effected by switch 83 under control of the area-regulation device 68 of Figs. 5 and 8.

When such two-segment control is employed, settings would be changed when total area generation reaches the upper end of the upper segment or the lower end of the lower segment. The new settings, as shown by the designated time periods of Fig. 4C, would include one segment of the two just previously used, the overlap permitting the control to accommodate itself to reversals in direction of generation change at the intersegment boundary without having to restore previous settings. Reverting to description of Fig. 8, concurrently with movement of the contacts with the ratio switches 80A—80C from one position to another position, new base-point settings of slidewires 56A, 72A of each station are selected. As indicated schematically in Fig. 8, the base-point switches 84A, 85A may be multi-point switches connected to taps of the slidewires 56A, 72A and operated by cam 82, or equivalent, so that the effective output voltages of these slidewires are automatically shifted to fix a new base-point setting for station E1 upon occurrence of a given total area generation. The corresponding base-point slidewires for the networks 55B et seq. and the remaining stations are similarly set. The cam 82, or equivalent mechanical or electro-mechanical arrangement for operating the switches, is so constructed that for any given base-point setting, the total generation may vary over a range from the adjacent lower and higher settings without effecting operation of the switches.

Thus, the base-point settings and a pair of participation settings for each station are automatically set in accordance with the total generation and the selection between the pair of participation settings is automatically made depending upon whether the total station generation is above or below the total of such base-point settings.

In Fig. 8, cam 82 or equivalent may be actuated by the summation of total area generation and area requirement: likewise, switches 83A—83C may be operated by the summation of total area generation and area requirement.

The apparatus shown in Fig. 9 is suited for producing a voltage $V_1$ representative of the area requirement whether the area be operating on a scheduled interchange which is zero, positive or negative, and whether the area requirement also involves frequency bias, time correction or integrated deviation. This apparatus embodies the meters and devices generically represented in Fig. 4 by the blocks 16, 17 and 19. The network 76, except for components 75, 77, 81 is similar to that described and claimed in copending Carolus application Serial No. 228,036, filed May 24, 1951, upon which has issued U. S. Letters Patent 2,688,728 and to which reference may be had for a more complete discussion. Briefly, the slidewire 220 is positioned by a wattmeter 17 responsive to the net interchange of the area. The contact 221 of slidewire 220 is positioned in accordance with the scheduled net interchange of the area and may be coupled to a dial 211 set by the load dispatcher in accordance with that quantity. Assuming the area is to operate on flat tieline load, the selector switch 214 is thrown to position connecting the detector 222 between the contact 221 of slidewire 220 and the point 223 common to the resistors 225, 226 of a branch circuit 224 in shunt to the branch circuit 219 which includes the slidewire 220. Assuming for simplicity that the area is operating on zero scheduled interchange, the bridge network comprising the branches 219, 224 is in balance when the contact 221 is opposite the center or zero point of the slidewire 220. If the area is not on schedule, the detector 222 is effective through the rebalancing mechanism 229 to effect adjustment of the rebalancing slidewires 227, 228. These slidewires are or may be, as in the aforesaid Carolus application, connected to recorder pen 230 to indicate the sense and magnitude of the deviation, such deviation corresponding with the area requirement. The slidewires 227, 228 of network 76 are also mechanically coupled to the slidewire 75 of network 54 so to produce in that network a voltage $V_1$ of polarity and magnitude corresponding with the area requirement, as fully previously discussed in connection with Fig. 5.

For an area schedule based on frequency bias of zero or of some finite value, the switch 214 is thrown to the position connecting the detector 222 between the contact 221 of slidewire 220 and the contact 232 of slidewire 233 which is positioned by a frequency meter or frequency recorder 216. The slidewires 235, 236 connected in series with slidewire 233 in branch 234 of network 76 are coupled for adjustment in unison by the dial 212 which is set by the load dispatcher in accordance with the system frequency at which the scheduled interchange corresponding with the setting of dial 211 is to be effected. The slidewire 237 in shunt to the branch 234 is adjusted by dial 213 set by the load dispatcher in accordance with the frequency bias for the area.

When the area is on a schedule involving correction of system time, the selector switch 214 is thrown by the load dispatcher to the illustrated position connecting detector 222 to the contact 239 of slidewire 240 which is actuated by the frequency meter 216 and is included in branch circuit 241 together with the slidewires 242, 243 which are differentially adjustable by the time-error meter 117.

When the area is on a schedule involving integration of the deviation from the scheduled interchange, the switch 214 is thrown to the position connecting detector 222 to the contact 244 of slidewire 245 which is actuated by a deviation integrator 218 of suitable type such as shown in Ross Patent No. 2,309,790.

Thus, whatever may be the basis of the area schedule, the output voltage $V_1$ of slidewire 75 will be of magnitude and sense corresponding with the deviation from schedule and therefore definitive of the area requirement.

The slidewires 227, 228 of network 76 may also be mechanically coupled to the switch 77 of device 78 for producing "raise" or "lower" signals, depending upon the sense of the area requirement, for transmission over channels 13A—13C to the controlled stations of the area. A suitable arrangement for adjusting the slidewires 75, 227, 228 and for actuating switch 77 is shown in copending Carolus application, Serial No. 253,533, now U. S. Patent 2,732,506.

During existence of abnormal area requirement, it may be desirable to transmit the "raise" or "lower" signals to all stations regardless of their normal allocated requirements to reduce the area requirement as quickly as possible. This temporary disabling of the normal control may be effected by providing a path for the "raise-lower" signals which is completed independently of the switches 37A—37C. For example, as shown in Fig. 9, the contacts 79 of relay 80 provide a path in shunt to switch 37C. When the area requirement is abnormal in either sense, the switch 81, operable in unison with slidewire 75, is closed to energize relay 80 and so provide such supplemental path for the "raise-lower" signals. In like manner, the normal control for units of a station (Fig. 10) may be temporarily disabled.

The systems previously herein described for maintaining an area on schedule and insuring predetermined sharing of the regulating requirements of an area among stations of that area are also generally applicable to any one or more of the controlled stations of the area to the end that the regulating assignment to a station may be shared among units of the station in accordance with schedules established by base-point and participation settings. By way of example, the generating station E1 of Fig. 4 may comprise, as shown in Fig. 10, a plurality of generating units X, Y, Z, each comprising an alternator and a prime mover therefor. These units may be of usual type having a fly-ball governor or other suitable governor for controlling the input to the prime mover. The setting of each governor may be varied automatically, as by a corresponding one of the reversible motors 90X—90Z operable by the "raise"-"lower" signals received from the load dispatcher's office over channel 13A. The circuit connections from channel 13A to motor 90Z are shown complete. The like circuit connections from channel 13A to motors 90X, 90Y and similarly respectively including switches 137X, 137Y are not shown in full to avoid unnecessary complexity of the drawing.

The station requirement, as determined by network 55A (Fig. 5) at the load dispatcher's office, is reproduced at station E1 as voltage 1V of network 154 (Fig. 10). Specifically, the slidewire 175 of network 154 may be positioned by a recorder repeater 91, responsive to signals from the telemetering transmitter 65A (Fig. 5), in accordance with the sense and extent of displacement of slidewire 58A (Fig. 5) from its zero output position.

The desired schedule for loading the units of the station may be set by adjustment of the unit base-point slidewires 156X—156Z having dials 160X—160Z and the unit participation slidewires 150X—150Z having dials 140X—140Z. The three slidewires 150X—150Z are in series in the network 154 which includes the source of voltage 1V varying in correspondence with station requirement and a voltage 2V varying, as later described, in correspondence with "station regulation." The voltage 1V may be the output voltage of a tapped slidewire 175 adjusted by the station requirement meter or recorder 91. Such voltage is zero for zero station requirement, is of finite value for a finite station requirement, and is of one polarity or the other depending upon whether the station requirement is positive or negative.

The participation slidewires 150X—150Z are also respectively included in networks 155X—155Z in number corresponding with the controlled units of the station. As these networks are of similar composition, only one of them need specifically be described. Network 155X for control of unit X includes, in addition to the percentage slidewire 150X, the three potentiometer slidewires 156X, 157X, 158X, each supplied from its own source of constant current or from a common source. Such sources, as well as all of the others used, may be of direct current or of alternating current. The slidewire 156X is set by the station operator in correspondence with the base point of unit X, the associated dial 160X continuously indicating the selected base point. The slidewire 157X is adjusted, as by recorder 128X, in accordance with the actual generation of unit X. Assuming that the network 155X is in balance, the output of slidewire 158X is zero when the difference between the output voltages of the slidewires 156X and 157X is equal and opposite to the output voltage of participation slidewire 150X. If such equality does not exist, a detector 163X responsive to the unbalance of network 155X, through a suitable relay mechanism 164X, such for example as disclosed in U. S. Letters Patent 1,935,732 and 2,367,746, effects adjustment of the slidewire 158X in proper sense and to extent required to balance network 155X. The extent of this adjustment which may be indicated or recorded is a measure of the existing regulating requirement of the unit and is termed "unit requirement." This measurement may be used by the station operator in manual control of "raise-lower" signals. Such balancing mechanism may also automatically initiate or route "raise" or "lower" signals, as by effecting closure of the corresponding side of switch 137X. As schematically illustrated in Fig. 10, the actuator 166X of switch 137X is connected to the rebalancing mechanism 164X by a mechanical linkage generically represented by dotted line 124X. The actuator 166X may be shaped so that the "raise" contacts are closed for one sense of displacement of slidewire 158X from zero output position and the "lower" contacts closed for the opposite sense.

The sense and extent of such rebalancing adjustment corresponding with the allocated unit requirement of unit X, may be indicated or recorded for use by the station operator in manual control of the unit generation or by automatic control mechanism later described.

In the particular arrangement of Fig. 10, upon occurrence of a station requirement and assuming that slidewire 158X is away from its zero output position, the switch 137X provides a path for transmission of "raise" or "lower" signals to governor motor 90X of unit X, until network 155X is again rebalanced with slidewire 158X in its zero output position, whereupon the switch is opened automatically to prevent further transmission of signals to that unit. Such rebalance is the result of the changed setting of slidewire 157X due to changed generation of unit X as may be measured by recorder or meter 128X. In like manner, the switches 137Y, 137Z respectively in circuit with governor motors 90Y, 90Z of units Y, Z are similarly controlled by the balanceable networks 155Y, 155Z.

Thus, assuming the networks 155X—155Z are in balance with slidewires 158X—158Z in zero position and that voltages 1V and 2V are zero (i. e. generation of each unit equal to its base-point setting and station requirement zero), and assuming area requirement is zero, then upon occurrence of an area requirement, "raise" or "lower" signals are sent over channel 13A from the load dispatcher's office to the station E1 where it is routed by switches 137X—137Z to the unit governor motors 90X—90Z. When in response to the demanded change in generation one of these units has met its allocated share, the further transmission of signals to that unit is interrupted by opening of the corresponding switch 137X, 137Y or 137Z.

However, the units practically never pick up their load at similar rates, and it is a prime purpose of this invention to insure that each unit takes its share of allocated regulation—no more no less—without regard to the rate at which other units take their allocated share. Control action to each unit is terminated to each unit when it assumes its allocated share, without effect on or by the other units.

To accomplish these objectives, there is introduced into the network 154, the two voltages 1V and 2V; the former (1V) is varied in accordance with station requirement and the latter (2V) is varied in accordance with the algebraic sum of the differences between the unit base-point settings and the actual generation of the controlled units. With voltage 1V omitted, the balance positions of slidewires 158X—158Z would not reflect existing station requirement and all of switches 137X—137Z may be in position for which signals are not transmitted to the units: with voltage 2V omitted, the balance positions of slidewires 158X—158Z would each depend on the rate at which other units were taking their allocated regulation.

For given unit base-point settings, the algebraic sum of voltages 1V and 2V, or the current produced by such sum, constitutes a reference definitive of the change in station generation from the base points required to meet the station's schedule. Thus, this reference corresponds, at the agreed frequency, with the difference between the sum of the unit base points and the station's allocated share of area load. Were voltage 1V omitted from network 154, the reference would correspond to the difference between the sum of the unit base points and that station's existent generation.

This reference, at the agreed frequency, remains fixed after the load change in the area despite the generation changes effected in the station to accommodate that station's share of such change: thus, during its control and having once met its percentage allocation, each unit of the station is unaffected by change in generation of the other units of the station. At other frequencies, this reference is modified in sense and to extent which corresponds with the generation increment required for satisfaction by the station of its share of frequency regulation.

This reference may be measured as by meter or recorder. The output voltage of each of slidewires 150X—150Z may be measured or recorded. Such measurements may be utilized by the station operator in manual control of the "raise-lower" signals.

Specifically, the voltage 2V may be produced by a slidewire 174 which is adjusted in unison with the balancing slidewire 171 of a computing network 127A. This network comprises a plurality of pairs of slidewires, the output voltage of one slidewire of each pair corresponding with the unit base-point setting of the corresponding generating unit and the output voltage of the other slidewire of the pair corresponding with the generation of that unit. For example, the output voltages of slidewires 172X, 173X respectively correspond with the base-point setting and the actual generation of unit X. The slidewire 172X of network 127A is mechanically coupled to the slidewire 156X of participation network 155X so that the station operator in setting the dial 160X to the desired base-point setting for unit X concurrently adjust the slidewires 156X, 172X of the two networks 155X, 127A. The other slidewire of the pair for unit X, namely, slidewire 173X of network 127A, is mechanically coupled to the slidewire 157X of network 155X for concurrent adjustment, as by the generation recorder 128X for unit X. In like manner, the remaining slidewires of network 127A are grouped in pairs, the slidewires 172Y et seq. being respectively mechanically coupled to the slidewires 156Y et seq. and the slidewires 173Y et seq. being coupled for adjustment in unison with the slidewires 157Y et seq.

Assuming that the sum of the output voltages of the slidewires 173X, 173Y et seq. is equal to the sum of the output voltages of the slidewires 172X, 172Y et seq., the network 127A is in balance for zero output voltage of the balancing slidewire 171 which, as shown, is a tapped slidewire affording zero output with the slidewire in an intermediate or center position with respect to the associated contact.

If the sum of the output voltages of the base-point settings of slidewires 172X—172Z is larger or smaller than the sum of the output voltages of the generation slidewires 173X—173Z, the network 127A is unbalanced in sense and to extent corresponding with the difference of such sums and the detector 169 in response to such unbalance effects, through a suitable relay device 168, a rebalancing adjustment of the slidewire 171. This difference between the total of the base-point settings of the units and the total generation of the units (such difference corresponding with station regulation) is injected into network 154 as voltage 2V which is algebraically additive to the station requirement voltage 1V. Specifically in the particular arrangement shown in Fig. 10, the voltage 2V is the output voltage of a tapped slidewire 174 adjustable in unison with rebalancing slidewire 171 of network 127A by the detector-relay mechanism 168, 169 which may be of type disclosed in aforesaid Patents Nos. 1,935,732 and 2,367,746.

For simplicity of description of operation of the complete system of Fig. 10, it is again assumed that the generation of each unit is equal to its base-point setting and that no area or station requirement exists. In such case the network 127A is in balance with the slidewire 171 in its zero output position and the voltages 1V and 2V of network 154 are also both of zero value. It is further assumed that for the particular base-point settings of the units, any positive station requirement should be divided between them in the ratios of 60%, 30% and 10% as determined by the settings of dials 140X—140Z. It is now again assumed that there occurs a positive area requirement of which 4 megawatts is allocated to station E1; whereupon voltage 1V assumes a value of polarity and magnitude corresponding with such station requirement and effects flow of current of corresponding magnitude and direction through the slidewires 150X—150Z. Accordingly, in each of the networks 155X—155Z, there is introduced a voltage proportional to that percentage of such current which is determined by the settings of the dials 140X—140Z. The detectors (163X—163Z) respond to unbalance of their associated networks (155X—155Z) and, through the relay devices (164X—164Z), effect closure of switches 137X—137Z in the "raise-lower" channels to the units of the station in sense demanding increased generation.

As each unit increases its generation in response to the "raise" signals, the generation change of each unit is introduced into the corresponding one of networks 155X—155Z by adjustment of the slidewires 157X—157Z, and the total of such generation change is introduced into the network 127A by the adjustment of slidewires 173X—173Z. Thus, as voltage 1V is reduced by the effect of the increased generation of the units upon the station requirement, the voltage 2V is correspondingly increased so that the sum of these voltages remains constant, aside from the aforementioned effect of frequency upon this reference. Thus, the current through the slidewires 150X—150Z remains essentially constant. As each unit meets its allocated percentage of the assumed station requirement, its network (155X, 155Y or 155Z) comes to balance and opens the associated switch (137X, 137Y or 137Z) to terminate the demand upon the unit for any further increase of generation regardless of whether or not the other units have met their share of such station requirement. For the example given, the additional generation taken by units X—Z is therefore 2.4, 1.2 and 0.4 megawatt.

The provision of network 127A and the introduction into network 154 of voltage 1V representative of station requirement, and of voltage 2V representative of the difference between the summation of the base-point settings of the units and their total generation insures that each of the units takes its allocated percentage of the station requirement, no more or no less.

With the control system shown in Fig. 10, and in absence of an existing area requirement, the adjustment by the station operator of the base-point slidewires 156X—156Z or of the participation slidewires 150X—150Z cannot result in any change in generation although the unit-requirement slidewires 158X—158Z assume new readings.

If the sum of the settings of the participation slidewires is 100%, the algebraic sum of the unit requirements is equal to the station requirement. In the example above fully discussed, the assumed conditions included unit requirements be zero. If due to the aforesaid manual resettings of base and participation dials or due to manual generation adjustments this were not so, there would always be at least one unit requirement in the same sense as any subsequent station requirement so that at all times at least one switch (137X, 137Y or 137Z) is in position to pass controlling signals to the corresponding unit. Continuance of the controlling signals as additional load changes occur in the area will ultimately return all unit requirements to zero and place all units on their assigned schedules.

In the previous discussion which concerns the preferred mode of operation, the recorder 168 records the positive and negative deviations of actual generation from the sum of the unit base points. With slidewires 156X—156Z, 172X—172Z set at zero or omitted, the recorder 168 records the total generation of the units. In both cases, existence of an area requirement demands a change in station generation proportioned by the setting of the corresponding slidewires 150X, 150Y or 150Z. Restoring slidewires 156X—156Z and transferring slidewires 172X—172Z to network 154 results in a control having the characteristics of Fig. 10 even though the position of slidewire 174 now represents station generation instead of station regulation.

By omitting generation slidewires 157X—157Z from networks 155X—155Z, the balance positions of slidewires 158X—158Z correspond with the total generation required of the corresponding units for all settings, including zero, of the base-point setting slidewires 156X—156Z, 172X—172Z. In such case, the station operator may actuate switches 137X, 137Y or 137Z in accordance with the difference between the actual generation of the corresponding unit as indicated on recorder 128X, 128Y or 128Z and the balance positions of slidewires 158X—158Z, or such difference may be utilized in automatic control.

Figure 6:
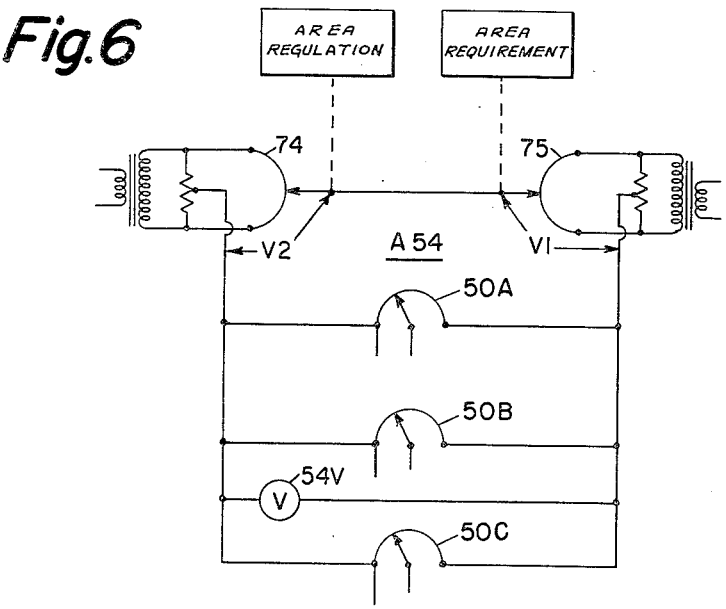
Figs. 6 and 7 illustrate modifications of part of one of the networks of Figs. 5 and 10.

It shall be understood that the station control system of Fig. 10 may use network modifications such as shown in Figs. 6, 7 and 9 and generally as described in connection with Fig. 5, it being pointed out that Figs. 5 and 10 are of similar composition, the corresponding elements being identified by the same reference characters increased by 100.

It shall also be understood that the two-segment and multiple-segment control of Fig. 8 may be incorporated in the system of Fig. 10.

When the network of Fig. 7 is utilized at station level, with the unit-participation slidewires independently adjustable, in addition to voltages corresponding with station regulation and station requirement, there may be injected in each of networks 54A, 54B, 54C voltages related to regulating or operating variables of the power distribution network such as area requirement and frequency. In fact, such additional voltages may be so introduced at area level. Arrangements in which such additional voltages are injected at station level, area level, or both, are described and claimed in my aforesaid copending application Serial No. 609,111.

It shall also be understood that the invention is not limited to the particular exemplary arrangements described. For example, instead of utilizing electrical networks employing electrical pressures or flow, there may be used, as in said Phillips Patent 2,754,429 hydraulic or pneumatic devices employing liquid or gas pressures or flows.

For brevity in the appended claims, the term "generating source" is used generically to mean a generating area, a generating station or a generating unit.

What is claimed is:

1. A system for controlling the generation of a group of generating sources operating under a schedule and connected to a common power distribution network comprising a group-requirement instrument responsive to a deviation from said schedule, devices responsive to change in generation of the individual sources, means for producing a reference effect having as components an effect corresponding with the response of said instrument and an effect corresponding with the summation of the responses of said devices, participation means for deriving percentages of said reference effect respectively corresponding with individual allocations for said sources, and means for transmitting "raise" or "lower" signals to said sources in dependence upon the sense of said deviation, said means comprising channels individual to the respective sources each capable of interruption when the response of the corresponding one of said devices bears a predetermined relation to the corresponding percentage of said reference effect.

2. A system as in claim 1 including means for changing the base-point settings of said sources at discrete values of their total generation, and means for changing the settings of said participation means as said total generation shifts from a range between two discrete values to an adjacent range to establish for said different ranges predetermined different percentage relations between the incremental changes of generation of the individual sources for the total generation required of said sources to maintain the schedule.

3. A system as in claim 1 in which the means for producing the reference effect is a circuit including sources of voltage respectively varied in accordance with the response of said instrument and with the summation of the responses of said devices.

4. A system as in claim 1 in which the means for producing the reference effect is a circuit including sources of voltage respectively varied in accordance with the response of said instrument and with the summation of the response of said devices, and in which the participation means comprises output elements included in said circuit and preset in accordance with aforesaid percentage allocations.

5. A system as in claim 4 in which each of said output elements is in a corresponding ancillary circuit including a corresponding one of said devices, each of said ancillary circuits including means responsive to unbalance between the outputs of said elements and said device of that ancillary circuit, the unbalance corresponding in sense with the change in generation required to attain aforesaid percentage allocation.

6. A system for controlling the generation of a group of generating sources operating under a schedule and connected to a common power distribution network comprising a group-requirement instrument responsive to a deviation from said schedule, signal means actuated by said instrument to produce "raise" or "lower" signals in dependance upon the sense of said deviation, channels for transmitting said signals to said sources and including switches for the individual channels, means for producing a reference effect having as components an effect varying as a function of the response of said instrument and an effect varying as a function of the total generation of said sources, and a plurality of balanceable means for respectively controlling said switches and each including means for producing effects respectively corresponding with the generation of a corresponding one of said sources and a predetermined percentage of said reference effect.

7. A system as in claim 6 in which the means for producing said reference effect is a circuit including sources of voltage respectively varied in accordance with the response of said instrument and with the total generation of said sources, and in which each of said balanceable means is an ancillary circuit including an element whose output is a predetermined fraction of said reference effect and an element whose output corresponds with the generation of one of said sources.

8. A system as in claim 6 in which each of the balanceable means is a circuit including a slidewire means providing output voltages corresponding with different base-point settings of one of said generating sources and slidewire means providing a voltage corresponding with the generation of that source, and in which there is additionally included means responsive to the total generation of said sources for selecting different base-point settings for discrete values of said total generation.

9. A system as in claim 6 which additionally includes means for changing the percentage for different ranges of the total generation of said sources.

10. A system for controlling the generation of a group of generating sources connected to a common distribution network and operating under a schedule comprising means for producing a voltage varying as a function of the generation required of the group to correct a deviation from said schedule, means for producing a voltage varying as a function of the generation of said group, and participation devices in number corresponding with said sources for deriving from the algebraic sum of aforesaid voltages a number of voltages respectively corresponding with the required generation of each of said sources.

11. A system for controlling the generation of a group of generating sources interconnected for exchange of power with a distribution network and operating under a schedule comprising a first balanceable network including devices whose outputs respectively correspond with the base-point settings of said sources and devices whose outputs respectively correspond with the generation of said sources, and means for producing an output corresponding with the generation required of each of said sources to correct a deviation from schedule comprising a second network including a device for producing therein an output corresponding with the unbalance of said first network, a device for producing therein an output corresponding with the existing deviation from schedule, and a participation device preset in accordance with the percentage of the group requirement allocated for the corresponding one of said sources.

12. A system for controlling the generation of a group of generating sources connected to a common distribution system and operating under a schedule comprising means for producing an effect varying as a function of the generation required of the group to correct a deviation from said schedule, means for producing an effect varying as a function of the generation of said group, and means including generation-allocation means in number corresponding with said sources for deriving from the algebraic sum of said effects a number of control effects respectively corresponding with the required generation of each of said sources.

13. A system for controlling the generation of a group of generating sources operating under a schedule comprising means for producing a reference effect having as components an effect corresponding with a deviation from said schedule and an effect corresponding with the summation of the generations of said sources, a plurality of control means for respectively varying the generation of the individual generating sources, and means for allocating to each of said control means a predetermined part of said reference effect.

14. A system for determining the generation of each generating source of a group connected to a common distribution system and required to maintain a group schedule comprising means for producing a first effect varying in accordance with deviation from said schedule, means for producing a second effect varying as a function of the total generation of said sources, and means for dividing in predetermined manner the sum of said effects into parts whose magnitudes are functions of the generation required from each of said sources to maintain said schedule.

15. A system for controlling the generation of a group of generating sources connected to a common distribution network to maintain a scheduled operating condition comprising means for producing a first effect varying in accordance with deviation of said condition from schedule, means for producing a second effect varying as a function of the generation of said sources, and means for changing the individual generations of said sources each in sense and to extent required to maintain predetermined relation between the generation of that source and the algebraic sum of said first and second effects.

16. A system for controlling the generation of a group of generating sources connected by at least one tie-line to a power-generating and distribution network and operating under a tie-line schedule comprising means for producing a first effect varying as a function of deviation from said schedule, means for producing a second effect varying as a function of the total generation of said sources, a plurality of control means for respectively varying the individual generations of said sources, and means for predetermining the participation of said sources in correction of said deviation and for predetermining the allocation of total generation among said sources comprising devices for distributing predetermined parts of said first and second effects among said control means.

17. A system as in claim 16 in which said devices are of construction simultaneously allocating equal parts of said first and second effects to the corresponding one of said control means.

18. A system as in claim 16 in which said devices are of construction affording independent allocation of equal or unequal parts of said first and second effects to the corresponding one of said control means.

19. A system for controlling the generation of a group of generating sources operating under a schedule and connected to a power distribution network comprising means for producing a first effect varying as a function of deviation from schedule, means for producing a second effect varying as a function of total generation of said sources, control means for varying the generation of said sources, means for predetermining the participation of said sources in the correction of said deviation and for predetermining the allocation of total generation among said sources comprising devices for distributing predetermined parts of said first and second effects among said control means, and group generation-responsive means for effectively shifting the settings of said devices.

20. A system as in claim 19 additionally including means for changing the base-point settings of said sources at discrete values of their total generation so that different allocations of total generation among the sources may be made for any given setting of said devices.

21. A system for controlling the generation of a group of generating sources operating under a schedule and connected to a power distribution network comprising means for producing a first effect varying as a function of deviation from schedule, means for producing a second effect varying as a function of total generation of said sources, control means for varying the generation of said sources, means for predetermining the participation of said sources in the correction of said deviation and for predetermining the allocation of total generation among said sources comprising first devices for distributing predetermined parts of said first and second effects among said control means, second devices for providing base-point settings of said sources, group generation-responsive means for shifting the setting of said second devices and for concurrently preselecting a pair of settings for each of said first devices at discrete values of group generation, and means responsive to said second effect for selecting one of each preselected pair of settings of said first devices when the group generation exceeds the summation of the base points and the other one of each preselected pair of settings when the group generation is less than the summation of the base points.

22. A system for controlling the generation of a group of generating sources operating under a schedule and connected to a power distribution network comprising means for producing a first effect varying as a function of deviation from schedule, means for producing a second effect varying as a function of the algebraic sum of the total generation of said sources and the summation of the base points of said sources, means for producing third effects each corresponding with the difference between the base point and the generation of the respective sources of the group, control means for varying the generation of said sources, means for predetermining the participation of said sources in the correction of said deviation and for predetermining the allocation of group regulation among said sources comprising devices for distributing predetermined parts of said first and second effects among said control means and means for additionally applying to the respective control means the corresponding third effect, and generation-responsive means for effectively shifting each of said devices from one to another setting in dependence upon the magnitude of the group generation with respect to the magnitude of the summation of the base points.

23. A system for controlling the generation of a group of generating sources operating under a schedule and connected to a power distribution network comprising means for producing a first effect varying as a function of deviation from schedule, means for producing a second effect varying as a function of the algebraic sum of the total generation of said sources and the summation of the base points of said sources, means for producing third effects each corresponding with the difference between the base point and the generation of the respective sources of the group, control means for varying the generation of said sources, means for predetermining the participation of said sources in the correction of said deviation and for predetermining the allocation of group regulation among said sources comprising first devices for distributing predetermined parts of said first and second effects among said control means and means for additionally applying to the respective control means the corresponding third effect, second devices for providing base-point settings of said sources, group generation responsive means for shifting the settings of said second dvices and for concurrently preselecting a pair of settings for each of said first devices at discrete values of group generation, and means responsive to said second effect for selecting one or the other of each preselected pair of settings of said first devices depending upon whether the group generation is above or below the summation of the base points.

24. In a system for determining the desirable generations of a group of generating sources, network means comprising devices respectively adjustable to provide a correspondingly variable signal, means for adjusting one of said devices in accordance with the total generation of said sources, means for adjusting another of said devices in accordance with the generation change required of the group to maintain a group schedule, and generation-allocation devices in number corresponding with said sources included in said network means and adjustable to derive from the algebraic sum of said signals predetermined parts thereof respectively corresponding with the total generation required of each of said sources to meet the group schedule.

25. A system for determining the generation required of each generating source of a group connected to a common distribution system and required to maintain a group schedule comprising means for producing composite effects, one for each source and each comprised of a first component which is a function of deviation from schedule and a second component which is a function of total generation of said sources, and means for predetermining for each source and for any concurrent values of deviation and total generation the relative magnitudes of said first and second components and the magnitude of the composite effect.

26. A system as in claim 25 in which the last-named means predetermines for each source for any concurrent values of deviation and total generation a fixed relation of the magnitudes of the first and second components of the composite effect of the corresponding source.

27. A system as in claim 25 in which the last-named means provides for independently predetermining for each source for any concurrent values of deviation and total generation the relative magnitudes of the first and second components of the composite effect for the corresponding source.

28. A system as in claim 25 in which the means for producing the composite effects comprises means for producing a first effect which is a function of deviation from schedule, means for producing a second effect which is a function of total generation of the sources, said first and second effects being equally affected by a unit change of deviation and total generation respectively, and means for combining said first and second effects to provide a common reference effect for the sources, and in which the means for predetermining the magnitudes of said composite effects for the different sources comprises means for allocating predetermined parts of said common reference effect among the sources.

29. A system as in claim 25 in which the means for producing said composite effects comprises means for producing a first effect which is a function of deviation from schedule and means for producing a second effect which is a function of total generation of the group, and in which the last-named means of claim 25 comprises means for allocating to each composite effect a first component having a selectable relation to said first effect and a second component having an independently selectable relation to said second effect.

30. A system for controlling the generation of a group of generating sources operating under a schedule and connected to a power distribution network comprising means for producing a first effect varying as a function of deviation from schedule, means for producing a second effect varying as a function of the algebraic sum of the group generation and the summation of the base points of said sources, means for setting said base points for said sources and producing a corresponding base point effect for each source, means producing for each source an effect corresponding with its individual generation, means for predetermining the participation of said sources in the correction of said deviation and for predetermining the allocation of group regulation among the sources comprising devices individual to the sources producing allocation effects corresponding with preset parts of said first and second effects, means for each source combining the corresponding allocation, base point and individual generation effects to provide a resultant effect corresponding with the regulating requirement of that source, and a plurality of control means individual to the sources and each utilizing the corresponding resultant effect for control of the generation of the associated source.

31. Network means comprising pairs of devices each adjustable to provide a correspondingly variable signal, the number of pairs corresponding with the number of generating sources in a group, means for respectively adjusting one of the devices of each pair to correspond with the base-point setting of the corresponding generating source, means for respectively adjusting the other device of each pair in accordance with the generation of the corresponding source, and means included in said network means and responsive to the algebraic sum of said signals for exhibiting the regulation of said group of generating sources.

32. In a system for controlling the generation of a group of generating sources, network means comprising devices respectively adjustable to provide a correspondingly variable signal, means for adjusting one of said devices in accordance with the difference between the summation of the generation of said sources and the summation of their base-point settings, means for adjusting another of said devices in accordance with the change in generation required of the group to meet a schedule, and means included in said network means and responsive to the algebraic sum of said signals for exhibiting the change, from the summation of the base points, of the generation of the group existent when the schedule is met.

33. In a system for controlling the generation of a generating source of a group, network means comprising devices respectively adjustable to provide a correspondingly variable signal, means for setting one of said devices in accordance with the base point of said source, means for adjusting another of said devices in accordance with the generation of said source, means for introducing into said network a signal having components respectively varying as a function of a predetermined percentage of the regulation of the group of sources and as a predetermined percentage of the generation change required of the group to maintain a group schedule, and means included in said network means and responsive to the algebraic sum of said signals for exhibiting the regulation requirement of said source.

34. In a system for controlling the generation of a generating source of a group, a network comprising a device adjustable to provide a correspondingly variable signal, means for setting said device in accordance with the base point of said source, means for introducing into said network a signal having components respectively varying as a function of a predetermined percentage of the regulation of the group of sources and as a predetermined percentage of the generation change required of the group to maintain a group schedule, and means included in said network and responsive to the algebraic sum of said signals for exhibiting the total generation required of said source.

References Cited in the file of this patent

UNITED STATES PATENTS

| | | |
|---|---|---|
| 2,273,829 | Boyle | Feb. 24, 1942 |
| 2,348,058 | Coates et al. | May 2, 1944 |